3,369,961
RADIATION-RESISTANT METAL SEALING GLASS
Robert H. Dalton, Corning, and Francis W. Martin,
  Painted Post, N.Y., assignors to Corning Glass Works,
  Corning, N.Y., a corporation of New York
Filed Jan. 30, 1964, Ser. No. 341,456
5 Claims. (Cl. 161—196)

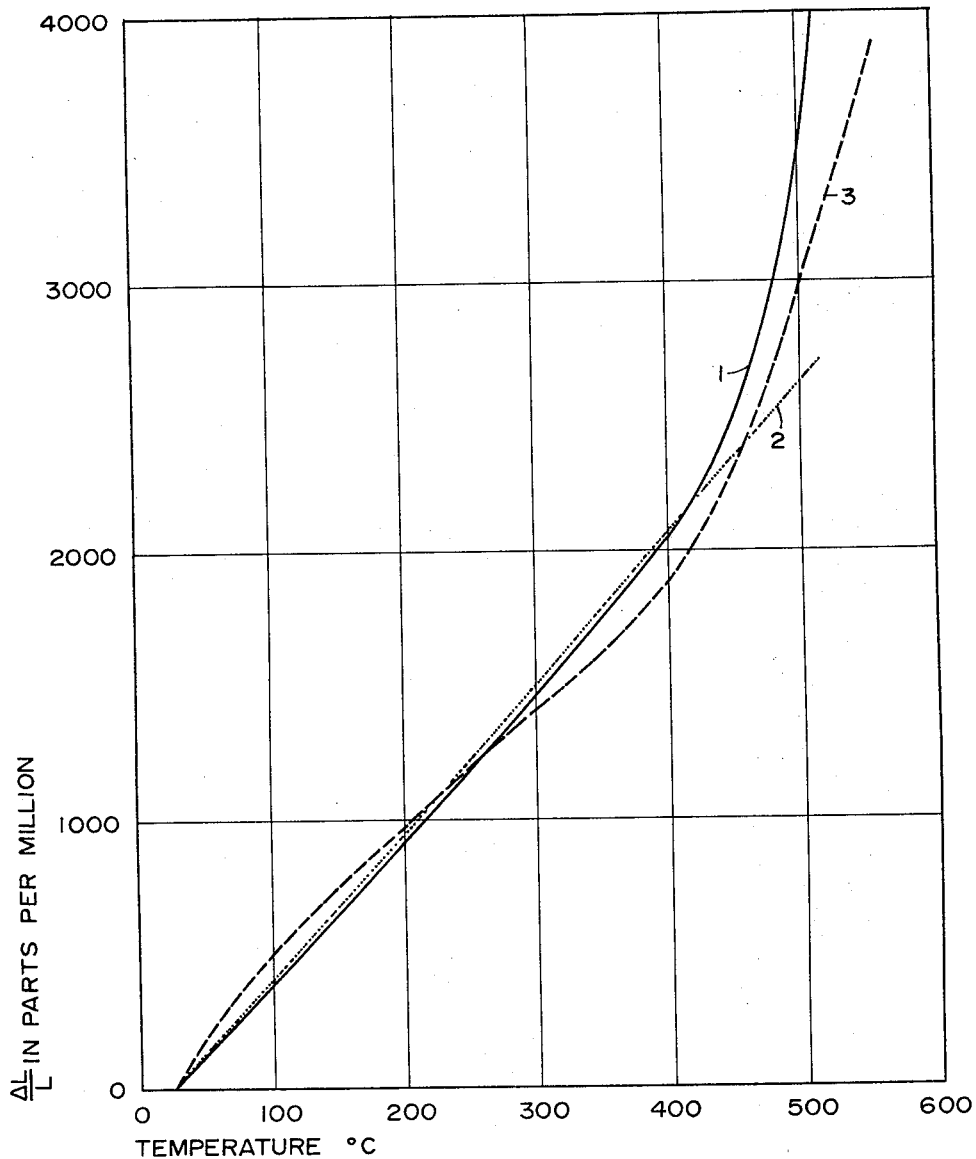

ABSTRACT OF THE DISCLOSURE

A radiation-resistant metal sealing glass having a coefficient of expansion of about 48 to $58 \times 10^{-7}/°$ C. consisting essentially of silica, lead oxide and alkali metal oxides together with optionally small amounts of boric oxide, zinc oxide, alumina and barium oxide.

---

This invention relates to glasses which are suitable for making glass-to-metal seals. More particularly, the invention relates to glasses adapted to forming seals with metals such as molybdenum and Kovar, and being resistant to thermal neutron irradiation.

The use of glass-to-metal seals in electron tubes and various other electronic devices is well known. The operation of many electronic control devices is dependent upon the stability of glass-to-metal seals in the components of the devices. It is frequently desirable to use such electronic control devices in close proximity to neutron emitting sources, such as the application of electronic control devices in nuclear reactors. Exposure to thermal neutrons frequently results in the failure of glass-to-metal seals in electronic components using the borosilicate glasses heretofore known for sealing to Kovar or molybdenum. Such failures may be avoided by providing a suitable shield of a material such as hafnium, gadolinium, etc., having a large nuclear cross section for thermal neutrons. Such shielding is expensive, heavy and space consuming, and may interfere with the neutron flux.

In many instances it is desirable to minimize space and weight, such as in the nuclear power plant of atomic submarines and spacecraft. In such instances it would obviously be desirable to avoid the use of special shielding for the electronic components. This, however, would require a sealing glass which is resistant to the adverse effects of thermal neutron irradiation.

It has been found that the borosilicate glasses heretofore used for sealing to Kovar and to molybdenum, under the influence of thermal neutron irradiation greater than about $10^{16}$ nvt, exhibit density changes which result in a failure of the glass-to-metal seal.

The expansion characteristics of Kovar and of molybdenum are such that a glass suitable for sealing both to Kovar and to molybdenum should exhibit an average coefficient of thermal expansion from room temperature to the strain point, of between about 48 and $58 \times 10^{-7}/°$ C. The thermal expansion of the glass above the strain point is not critical since no objectionable strain will develop at these temperatures due to the plasticity of the glass. In addition the glass should have a strain point below about 500° C. Above that temperature, the expansion curves of Kovar and molybdenum diverge to such an extent as to make it impractical to attempt to match each of them with a single glass.

It is a primary object of the present invention to provide sealing glasses which overcome the foregoing difficulties and exhibit a high degree of resistance to thermal neutron irradiation.

It is a further object to provide glasses which are suitable for forming glass-to-metal seals with metals having expansion properties similar to Kovar and to molybdenum.

It is a further object to provide glass-to-metal seals suitable for use in electronic devices in close proximity to neutron emitting sources.

It is a further object to provide glass compositions which are well adapted to conventional glass melting and glass forming practices and to the production of electronic components.

I have now found that the above and other objects may be achieved with glasses consisting essentially of, in weight percent, 60–67% $SiO_2+B_2O_3$, 22–30% PbO + ZnO, 4–7% alkali metal oxides, 0–5% $Al_2O_3$, and 0–3% BaO, the amount of $B_2O_3$ being less than about 6%, and the amount of ZnO being less than about 5%. Glasses having compositions within the above ranges are well suited for the production of glass-to-metal seals with metals having expansion properties similar to Kovar and to molybdenum. In addition, glass-to-metal seals utilizing glasses of the present invention, have been tested under reactor conditions and found to perform satisfactorily after exposure to thermal neutrons of up to about $10^{18}$ nvt.

The expansion matching characteristics of the glasses of the present invention are exemplified in the accompanying drawing wherein Curve 1 is the expansion curve of a preferred glass of the present invention. Curve 2 is the expansion curve of molybdenum and Curve 3 is the expansion curve of Kovar metal alloy (54% Fe, 29% Ni, 17% Co)

Variations in the proportions of the constituents of the present glasses should be confined within the limits set forth above for the following reasons:

Excessive amounts of $SiO_2$ tend to objectionably harden the glass and raise its liquidus temperature too much for successful mechanical tube-drawing operations. However, a deficiency of $SiO_2$ results in too high an expansion for satisfactory sealing to Kovar or molybdenum, and decreases the chemical durability.

The working properties of the glasses may be improved by the addition of up to about 6% $B_2O_3$. In particular, a higher viscosity at the liquidus is achieved, thus permitting fabrication on conventional tube drawing equipment. For this purpose, I have found it preferable to use glasses containing between about 4 and 6% $B_2O_3$. However, if $B_2O_3$ is present much in excess of about 6%, the thermal neutron irradiation resistance of the glass is adversely affected.

PbO serves as a fluxing agent to aid in the melting of the glass without producing a loss of resistivity such as would be the case with most other fluxing agents. However, excessive amounts will lower the viscosity at the liquidus unduly and have an adverse affect on the chemical durability of the glass.

ZnO may be used in amounts up to about 5% by weight as a substitute for PbO to lower the expansion of the glass. An excess of ZnO tends to raise the strain point of the glass unduly, and also increases the tendency to crystallize.

An alkali content in the range of 4 to 7% is necessary to achieve the proper expansion characteristics for Kovar sealing. In general, better durability, higher electrical resistivity and a lessening of the tendency to devitrify are achieved if a mixture of alkali-metal oxides is used. Such a mixture should preferably include $Na_2O$, $K_2O$ and $Li_2O$.

It is preferable, though not essential, that a small amount of Li$_2$O be included in the composition to maintain easy meltability. However, for maximum neutron irradiation resistance it is desirable to use glasses having less than about 1% Li$_2$O.

Greater resistance to devitrification during the production of tubing is achieved by the presence of up to about 5% Al$_2$O$_3$. An excess of Al$_2$O$_3$ above 5% results in an objectionable increase in the melting temperature of the glass. In a preferred form, the glasses of the present invention contain between about 2 and 5% Al$_2$O$_3$.

The physical properties of the glasses may be varied by the inclusion of up to about 3% BaO which acts to increase the expansion coefficient, increase the strain point, softening point, and annealing point, and serves as a flux in the glass composition. Excessive amounts of BaO should be avoided.

In addition, minor amounts of other known glass batch constituents, that do not materially alter the desirable properties of the glass, may be added. For example, minor amounts of colorants may be added if desired. Also, finding agents such as As$_2$O$_3$ may be employed to aid in melting without materially affecting the desired neutron irradiation resistance or metal sealing properties.

The following example illustrates the formulation of the preferred glass shown in the accompanying drawing:

*Example 1*

| Batch Ingredients (parts by weight): | | Theoretical Composition of Glass (in wt. percent as calculated from the batch) | |
|---|---|---|---|
| Pulverized Sand | 300 | SiO$_2$ | 60 |
| Lithrage | 120 | PbO | 24 |
| Boric acid | 44 | B$_2$O$_3$ | 5 |
| Calc. K$_2$CO$_3$ | 22 | K$_2$O | 3 |
| NaNO$_3$ | 27 | Na$_2$O | 2 |
| Li$_2$CO$_3$ | 6.2 | Li$_2$O | 0.5 |
| Calc. Al$_2$O$_3$ | 25 | Al$_2$O$_3$ | 5 |
| As$_2$O$_3$ | 2.5 | As$_2$O$_3$ | 0.5 |

Soft. Pt., 730° C. Annealing Pt., 503° C. Strain Pt. 460° C.

Coefficient of thermal expansion 51.5 x 10$^{-7}$ (0–300° C.).

The batch ingredients were melted in a 96% silica container at a temperature of about 1450° C.

By way of further illustration, Table I, below, shows several glass compositions given in terms of oxide content in weight percent as calculated from the batch, which may be employed in carrying out the present invention.

TABLE I

| Example | 2 | 3 | 4 | 5 | 6 |
|---|---|---|---|---|---|
| Percent: | | | | | |
| SiO$_2$ | 57 | 57 | 60 | 55.5 | 60.5 |
| PbO | 29 | 26 | 24 | 30 | 30 |
| B$_2$O$_3$ | 5 | 5 | 5 | 5 | ------ |
| Na$_2$O | 2 | 2 | 2 | 2 | 1.5 |
| K$_2$O | 2.5 | 2.5 | 3.5 | 2 | 2 |
| Li$_2$O | ------ | ------ | 0.5 | 0.5 | 0.5 |
| ZnO | ------ | 5 | ------ | ------ | ------ |
| BaO | 2 | ------ | ------ | ------ | 3.0 |
| Al$_2$O$_3$ | 2 | 2 | 4.5 | 4.5 | 2.0 |
| As$_2$O$_3$ | 0.5 | 0.5 | 0.5 | 0.5 | 0.5 |
| Soft. Pt. (° C.) | 710 | 714 | 724 | 696 | 756 |
| Annealing Point (° C.) | 513 | 503 | 500 | 488 | 505 |
| Strain Pt. (° C.) | 474 | 463 | 455 | 448 | 462 |
| Expansion (×10$^{-7}$) (0–300° C.) | 53.5 | 50.5 | 52.8 | 52.2 | 50.5 |

The glasses of the present invention may be produced from conventional batch ingredients such as those set forth in Table II, below, where the batch compositions correspond to the oxide compositions set forth in Table I, above. The glasses may be melted in accordance with conventional glass making practice at a temperature of about 1350–1550° C.

TABLE II

| | Batch Compositions (Parts by Weight) | | | | |
|---|---|---|---|---|---|
| | 2 | 3 | 4 | 5 | 6 |
| Pulv. Sand | 285 | 285 | 300 | 378 | 303 |
| Lithrage | 145 | 130 | 120 | 150 | 150 |
| Boric Acid | 45 | 45 | 44 | 44 | ------ |
| NaNO$_3$ | ------ | ------ | ------ | 27 | 21 |
| Na$_2$CO$_3$ | 17 | 17 | ------ | ------ | ------ |
| Calc. K$_2$CO$_3$ | ------ | ------ | 26 | 15 | ------ |
| Pearl Ash | ------ | ------ | ------ | ------ | ------ |
| KNO$_3$ | 27 | 27 | ------ | ------ | ------ |
| Li$_2$CO$_3$ | ------ | ------ | 6.2 | 6.2 | 6.2 |
| ZnO | 25 | ------ | ------ | ------ | ------ |
| BaCO$_3$ | 13 | ------ | ------ | ------ | 19 |
| Al(OH)$_3$ | ------ | ------ | 23 | 23 | ------ |
| Calc. Al$_2$O$_3$ | ------ | ------ | 23 | 23 | ------ |
| As$_2$O$_3$ | 2.5 | 2.5 | 2.5 | 2.5 | 2.5 |

Arsenic trioxide was employed as a fining agent in the above examples in amounts which had substantially no effect of the physical and chemical properties of the final glass. Other fining agents, such as Sb$_2$O$_3$, may be employed in place of As$_2$O$_3$, or the fining agent may be omitted entirely, if desired.

It will be apparent to those skilled in the art that many variations and modifications of the invention as hereinabove set forth may be made without departing from the spirit and scope of the invention. The invention is not to be limited to those details shown above except as set forth in the appended claims.

We claim:

1. A glass consisting essentially of, in weight percent as calculated from the bath, 60–67% SiO$_2$+B$_2$O$_3$, 22–30% PbO+ZnO, 4–7% of a mixture of alkali metal oxides including Na$_2$O, K$_2$O and Li$_2$O, 2–5% Al$_2$O$_3$, 0–3% BaO, the total B$_2$O$_3$ being between about 4 and 6%, the total ZnO being less than about 5%, the total Li$_2$O being less than about 1.0%, the average coefficient of linear thermal expansion of the glass being between about 48×10$^{-7}$ and 54×10$^{-7}$ per ° C. between room temperature and the strain point of the glass.

2. A glass consisting essentially of, in weight percent as calculated from the batch, 60% SiO$_2$, 24% PbO, 3% K$_2$O, 2% Na$_2$O, 0.5% Li$_2$O, 5% Al$_2$O$_3$, 5% B$_2$O$_3$ and 0.5% As$_2$O$_3$.

3. A glass-to-metal seal in which the glass consists essentially of, in weight percent as calculated from the batch, 60–67% SiO$_2$+B$_2$O$_3$, 22–30% PbO+ZnO, 4–7% K$_2$O, 0–5% Al$_2$O$_3$, 0–3% BaO, the B$_2$O$_3$ content being less than about 6%, and the ZnO content being less than about 5%, and the metal is selected from the group consisting of Kovar and molybdenum.

4. A glass-to-metal seal according to claim 3 wherein said metal is Kovar.

5. A composite material comprising a glass consisting essentially of 60–67% SiO$_2$+B$_2$O$_3$, 22–30% PbO+ZnO, 4–7% mixed alkali metal oxides, 0–5% Al$_2$O$_3$, 0–2% BaO, wherein the B$_2$O$_3$ content is between 0 and 6%, and the ZnO content is between 0 and 5%, and a metal selected from the group consisting of Kovar and molybdenum.

References Cited

UNITED STATES PATENTS

| 2,392,314 | 1/1946 | Dalton | 161—196 |
| 2,692,833 | 10/1954 | Armistead | 106—53 |
| 2,830,000 | 4/1958 | Labino | 106—53 |
| 3,138,561 | 6/1964 | Labino | 106—53 |

OTHER REFERENCES

Geller et al.: "The System K$_2$O.PbO.SiO$_2$," J. Res. Nat'l. Bureau of Standards, August 1963 (pp. 287–289).

Partridge, J. H.: Glass-to-Metal Seals, Sheffield, England, Society of Glass Technology 1949, pp. 4, 39, and 40.

HELEN M. McCARTHY, *Primary Examiner.*